United States Patent [19]
Hoffman et al.

[11] Patent Number: 4,789,712
[45] Date of Patent: Dec. 6, 1988

[54] STABLE DISPERSIONS OF POLYMERS IN POLYEPOXIDES

[75] Inventors: Dwight K. Hoffman; Charles B. Arends, both of Midland, Mich.

[73] Assignee: The Dow Chemical Company, Midland, Mich.

[21] Appl. No.: 83,135

[22] Filed: Aug. 10, 1987

Related U.S. Application Data

[60] Division of Ser. No. 664,672, Oct. 25, 1984, Pat. No. 4,708,996, which is a continuation-in-part of Ser. No. 517,130, Jul. 25, 1983, abandoned.

[51] Int. Cl.$^4$ .................. C08F 283/10; C08L 63/10
[52] U.S. Cl. .................... 525/528; 525/529; 525/530; 525/531; 525/922
[58] Field of Search ............ 525/528, 529, 530, 531, 525/112, 922

[56] References Cited

U.S. PATENT DOCUMENTS

| | | | |
|---|---|---|---|
| 4,098,841 | 7/1978 | Nagata et al. | 525/922 |
| 4,221,697 | 9/1980 | Osborn et al. | 525/530 |
| 4,221,892 | 9/1980 | Baron et al. | 525/531 |
| 4,443,568 | 4/1984 | Woo | 525/531 |
| 4,444,923 | 4/1984 | McCarty | 525/108 |
| 4,482,671 | 11/1984 | Woo et al. | 525/531 |
| 4,524,181 | 6/1985 | Adam et al. | 525/107 |

FOREIGN PATENT DOCUMENTS

| | | | |
|---|---|---|---|
| 49-106586 | 10/1974 | Japan | 525/531 |
| 55-18401 | 2/1980 | Japan | 525/530 |
| 85/00610 | 2/1985 | PCT Int'l Appl. | 525/530 |
| 1073906 | 6/1967 | United Kingdom | 525/531 |

Primary Examiner—John C. Bleutge
Assistant Examiner—Robert E. L. Sellers, II

[57] ABSTRACT

Dispersions of polymers and optional dispersion stabilizers in a polyepoxide resin continuous phase is characterized in that the dispersion remains stable above 60° C. The compositions are curable and are useful as coatings, in preparing laminates and reinforced plastics, and as adhesives. The compositions exhibit properties which are superior to compositions containing reactive liquid polymers.

8 Claims, No Drawings

STABLE DISPERSIONS OF POLYMERS IN POLYEPOXIDES

CROSS-REFERENCE TO RELATED APPLICATION

This is a divisional, of application Ser. No. 664,672, filed Oct. 25, 1984, now U.S. Pat. No. 4,708,996, which is a continuation-in-part of U.S. patent application Ser. No. 517,130, filed July 25, 1983, now abandoned.

BACKGROUND OF THE INVENTION

The present invention relates to polyepoxide compositions, and in particular, to those polyepoxide compositions which contain polymerizates dispersed therein.

Epoxy resins have a spectrum of properties that are well adapted for use in coatings, adhesives, fiber reinforced laminates, composites, engineering plastics, and specialty applications, such as potting resins and mortars. Among those properties are corrosion and solvent resistance, good adhesion and electrical properties, good dimensional stability, hardness, low shrinkage on cure and many other beneficial properties.

Unfortunately, a major disadvantage of epoxy resins concerns an undesirable brittleness. A partial solution to such a problem has been the addition of reactive liquid polymers (RLP). These RLP's are generally elastomers, such as carboxyl-terminated butadiene-acrylonitrile copolymers, which precipitate out of solution during cure of the polyepoxide. The precipitation results in the formation of discrete elastomer particles or domains which toughen the resin. Although toughening the cured resin, such a technique results in a significantly lowered softening temperature. Particle size is a major factor which determines the mechanical properties. The selectivity and reactivity of the functional groups are critical in the formation of the particles. Also, the curing conditions seriously affect their size and structure. Another disadvantage is that the RLP is limited to low molecular weights for good mixing and low viscosity.

Curable epoxy resin compositions containing acrylate rubbers are disclosed in European Patent Application No. 78527. For example, the reference discloses polyepoxides containing rubbers prepared from butyl acrylate. Unfortunately, said rubbers are soluble in the polyepoxide continuous phase at temperatures above about 51° C., and in some instances at room temperature. Thus, undesirable softening of the cured resin upon cure conditions can readily occur. In addition, it is difficult to control particle size of the dispersed phase polymerizate because dissolving and reprecipitation of said polymerizate is difficult to control. Such a control of parameters such as particle size of the polymerizate are critical in optimizing mechanical properties of the composition.

U.S. Pat. No. 4,221,697 teaches stable dispessions of an inorganic reinforcing phase in preformed polymer matrices, such that the inorganic, particulate dispersed phase is bonded to the polymer matrix. Although the reference discloses as suitable polymer matrices, polymers of alkyl acrylates and polyepoxides, the reference does not provide a teaching of stable polymer dispersions in a polyepoxide resin.

Japanese Patent No. 55-018401 discloses flexible epoxy resin compositions which comprise epoxy resins, epoxy resin hardeners, vinyl monomers, crosslinking monomers and initiators such that an acrylate elastomer in continuous phase type composition is obtained. Unfortunately, such a mixture does not provide a teaching of a toughened epoxy resin.

It would be highly desirable to provide a process for significantly improving the toughness of epoxy resins without sacrificing the other properties which would extend the utility of said resins. It would be particularly desirable to provide a control over dispersed particle size, to provide dispersed particles which are highly incompatible with the continuous epoxy phase and to provide a product having high heat distortion temperatures in the cured form. In addition, it would be desirable to provide a more processable polymer-modified epoxy resin (i.e., lower viscosity than that exhibited by RLP modified resins).

Thus, in view of the deficiencies of the prior art, it would be highly desirable to provide a stable dispersion of a polymer in an epoxy compound, wherein the dispersed polymer phase is formed by polymerizing monomers in situ (i.e., in the epoxy compound) and does not interfere with the desirable properties of the epoxy compound; and which composition when cured exhibits (1) a high glass transition temperature; and (2) a good toughness, as provided by a dispersed elastomeric polymer phase.

SUMMARY OF THE INVENTION

The present invention is a dispersion of a polymer and optional dispersion stabilizer in a polyepoxide as a continuous phase characterized in that the dispersion remains stable in the polyepoxide at a temperature above 60° C. For purposes of this invention, the dispersion stabilizer is also called a dispersant.

The present invention in another aspect is a process for preparing the aforementioned dispersion of a polymer in a polyepoxide continuous phase, which process comprises (1) providing an adduct by reacting a minor amount of functional monomer with a polyepoxide continuous phase (2) providing a dispersion stabilizer by reacting the adduct with at least one monomer, and (3) polymerizing said monomer(s) in the polyepoxide continuous phase and in the presence of said dispersion stabilizer.

The present invention in yet another aspect is a process for preparing the aforementioned stable dispersion of a polymer in a polyepoxide continuous phase, which process comprises (1) providing an adduct by reacting a minor amount of functional monomer with a polyepoxide continuous phase (2) providing a dispersion stabilizer by reacting the adduct with at least one monomer, while simultaneously polymerizing said monomer(s) in the polyepoxide continuous phase and in the presence of said dispersion stabilizer.

As used herein the term "stable" is meant to refer to dispersions which remain substantially constant (i.e., do not undergo substantial reprecipitation or redispersion) under conditions of preparation as well as conditions of thermal cure. For example, the dispersion of polymer remains stable (e.g., insoluble) under normal preparation, handling and processing (e.g., curing) conditions by maintaining a substantially constant morphology (e.g., size and distribution) in lo the continuous phase at some temperature above 60° C. Stable dispersions are, for example, those dispersions in which the polymer dispersed phase is insoluble in the continuous phase. Insolubility can be qualitatively identified by a cloudiness of the composition to visible observation.

Stable dispersions of this invention find a wide variety of uses in numerous applications. For example, stable dispersions are used as coatings (e.g., solution, high solids or powder coatings); fiber-reinforced laminates; advanced composites including aerospace, fiberglass reinforced plastics; tooling, casting and molding resins; bonding agents and adhesives agents in flooring, paving and exposed aggregate applications; and the like.

DETAILED DESCRIPTION OF THE INVENTION

Epoxy compounds useful in this invention include a wide variety of epoxy compounds. Typically, the epoxy compounds are epoxy resins which are also referred to as polyepoxides. Polyepoxides useful herein can be monomeric (e.g.,the diglycidyl ether of bisphenol A), higher molecular weight advanced resins or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, *Handbook of Epoxy Resins,* Chapter 2, McGraw Hill, New York (1967).

While the invention is applicable to polyepoxides, generally preferred polyepoxides are glycidyl polyethers of polyhydric alcohols or polyhydric phenols having weights per epoxide group of 150 to 20,000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The polyepoxide may also include a minor amount of a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

Dispersed phase polymers are typically organic polymers which are most desirably polymerizates of at least one ethylenically unsaturated monomer. Vinyl monomers useful herein are those which polymerize in situ in the polyepoxy continuous phase and provide polymers which form stable dispersions in the continuous phase. Combinations of monomers can be employed and polymerized in order to provide a stable dispersion in the epoxy resin as defined hereinbefore. Examples of vinyl monomers which may be employed include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as chlorostyrene, 2,5-dichlorostyrene, bromostyrene, fluorostyrene, trifluoro-methylstyrene, iodostyrene, cyanostyrene, nitrostyrene, N,N-dimethylaminostyrene, acetoxylstyrene, methyl-4-vinyl-benzoate, phenoxystyrene, p-vinyl diphenyl sulfide, p-vinylphenyl phenyl oxide, and the like; substituted acrylic monomers such as acrylonitrile, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl butyrate, isopropenyl acetate, vinyl formate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy,-2'-vinyloxy diethyl ether, vinyl 2-ethylmercaptoethyl ether, vinyl methyl ketone, vinyl ethyl ketone, vinyl phosphonates such as bis(β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, monomethyl itaconate, t-butylaminoethyl methacrylate, dimethylaminoethyl methacrylate, allyl alcohol, dichlorobutadiene, vinyl pyridine and the like. Any of the known polymerizable monomers can be used and the compounds listed above are illustrative and not restrictive of the monomers suitable for use in this invention.

Preferably, the monomer which is employed forms a soft polymer measured as a glass transition temperature below use temperature. Representative monomers are the alkyl esters of acrylic and methacrylic acids wherein the alkyl group contains at least 4 carbon atoms preferably greater than 4 carbon atoms, and more preferably greater than 4 to about 16 carbon atoms. A monomer such as 2-ethylhexyl acrylate is preferred. Other representative monomers are the dienes such as butadiene and isoprene. Yet another useful class of monomers is the vinylized polyoxyalkylenes. Copolymers of such monomers with other comonomers can also be used. For example, styrene and butadiene form a well-known class of elastomers. Most preferred are the monomers forming elastomers.

Although monomers forming polymers having high softening temperatures can be used, the polymers have less beneficial influence on the toughness of the cured dispersions. Such polymers can be employed as might be desired, for example, as pigments, fillers, low profile agents for providing reduced shrinkage and improved surface appearance, etc. Generally, it is desirable to employ a stabilizer. However, compositions within the present invention can be formed with hard polymers having a glass transition temperature or crystalline melting point above the polymerization temperature of the polymer and cure temperature of the polyepoxide without the presence of a stabilizer, e.g., polyacrylonitrile.

A functional monomer having a reactive group in addition to a polymerizable vinyl functionality can be incorporated in a minor amount in the monomer mixture which polymerizes to form the dispersed phase. Illustrative of functional monomers are acrylic acid, methacrylic acid, crotonic acid, itaconic acid, 2-hydroxyethyl or propylacrylate, 2-hydroxyethyl methacrylate, t-butylaminoethyl methacrylate, β-isocyanatoethyl methacrylate, glycidyl acrylate, glycidyl methacrylate, glycol monoesters of itaconic acid, methyl monoester of itaconic acid, acrylamide or substituted acrylamides, allyl alcohol, maleic acid, fumaric acid, isopropenyl phenol, and the like. Such monomers can provide sites for subsequent crosslinking or for bonding to the polyepoxide continuous phase matrix.

In addition, monomers containing more than one vinyl group can be used at low levels to increase the molecular weight of the dispersed phase. Examples of such comonomers are the polyvinyl monomers, such as divinylbenzene, allyl methacrylate, ethylene glycol dimethacrylate, trimethylol propane triacrylate, and the like.

The vinyl polymerization is induced and maintained by conventional free radical catalysts and elevated temperatures. The concentration of the catalyst can vary from about 0.001 to about 10 percent, preferably from about 0.2 to about 1.0 percent; however, any effective catalytic amount is satisfactory. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, alpha,alpha'-azo-2-methyl butyronitrile, alpha, alpha'-2-methyl heptonitrile, 1,1'-azo-1-cyclohexane carbonitrile, dimethyl, alpha, alpha'-azoisobutyrate, 4,4'-azo-4-cyanopentanoic acid, azobisisobutyronitrile, persuccinic acid, diisopropyl peroxy dicarbonate, and the like; a mixture of catalysts may also be used.

The vinyl polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, N,N-dimethylacetamide, halogenated solvents and the like, including those known in the art as being suitable solvents for the polymerization of vinyl monomers. The only requirement in the selection of the inert solvent is that it does not substantially interfere with the monomer's polymerization reaction. Any solvent, if used, is removed before curing.

The vinyl polymerization system may also contain small amounts of from about 0.1 to 2 percent by weight of a chain transfer agent based on the weight of vinyl monomer in the dispersed phase. Alkyl mercaptans having from one to twenty carbon atoms in the alkyl chain may be employed in the present invention. Representative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, stearyl mercaptan. Other chain transfer agents such as disulfides and halogenated compounds, especially brominated compounds, can be used.

Typically, the process of the invention comprises preparing a dispersion of a polymer in a polyepoxide by polymerizing at least one monomer in the polyepoxide at a polymerization temperature above the softening point of the polyepoxide. The polymerization reaction can take place in the presence of, for example, a vinylized epoxy resin adduct or in the presence of a dispersion stabilizer.

Dispersion stabilizers (also known as dispersants) are employed in the process of this invention in order to prepare a dispersion more easily and also to provide dispersions having superior stability. A dispersion stabilizer is any molecule which contains at least two different segments, one of which is compatible with the polyepoxide and one of which is compatible with the polymer particles of the dispersed phase. See, for example, *Dispersion Polymerization in Organic Media,* edited by K. E. J. Barrett, John Wiley and Sons, London (1975).

Reactive functional monomers useful in preparing dispersion stabilizers of this invention can be described as those monomers having a functionality capable of undergoing a polymerization reaction with the monomers forming the dispersed phase (e.g., a vinyl functionality) and a functionality capable of reacting or coupling with a reactive moiety of an epoxy compound (e.g., an epoxy functionality). The reaction product of a reactive functional monomer and an epoxy resin to form a new product having vinyl unsaturation can be called a vinylized adduct. Vinylized aducts are typically prepared by reacting an oxirane moiety of a polyepoxide with an ethylenically unsaturated functional monomer such as those described hereinbefore. The reactivity of functional groups, process conditions for reaction and other reaction parameters are disclosed in Lee and Neville, *Handbook of Epoxy Resins,* McGraw Hill, New York (1967) at Appendix 5-1 and the bibliography in Chapter 5, pages 39–40. Catalysts useful in preparing vinylized adducts from, for example, polyepoxides and unsaturated carboxylic acids include the ethyl triphenyl phosphonium acetate, acetic acid complex and other onium compounds; tertiary amines such as tris(dimethylaminoethyl) phenol; triphenyl phosphine; metal salts such as chronium chloride and chronium acetate; and other catalysts which catalyze the epoxy/carboxy reaction. If desired, it is possible to incorporate a polymerization inhibitor into the reaction mixture in order to prevent premature vinyl polymerization of the ethylenically unsaturated moieties prior to the completion of the epoxy/carboxy reaction. Examples of such inhibitors include 2,6-di-tertiary-butyl-4-methylphenol, p-methoxyphenol, hydroquinone and tetrahydrothiazine. Such inhibitors can be additionally employed for improved storage of the reactive functional monomer.

The dispersion stabilizer can be prepared using a variety of techniques. For example, the dispersion stabilizer can be prepared in situ early in the preparation of the dispersion by reacting a functional monomer (e.g., acrylic acid) with the epoxy compound in the presence of a suitable catalyst. The resulting epoxy compound having reactive functional groups (e.g., ethylenically unsaturated moieties) can be further reacted with the other monomers which polymerize to form the dispersed phase. Alternatively, for example, the dispersion stabilizer can be prepared separately and added to the epoxy compound before or during addition and polymerization of the monomers which polymerize to form the dispersed phase.

The process of this invention provides a means for the skilled artisan to prepare stable dispersions of a polymer in a polyepoxide continuous phase, in which the polymers are dispersed as particles which are formed before curing. The polymers which form the dispersed phase can comprise the polymerization product of one or more monomers (e.g., form a copolymer). The polymerization reaction can be a step reaction such as in the preparation of condensation polymers, or an addition polymerization such as in the polymerization of ethylenically unsaturated monomers. The addition polymerization can be cationic, anionic or coordination polymerization; or free-radical chain addition. Generally preferred is the free-radical chain addition. Most preferred is the free-radical polymerization of one or mcre ethylenically unsaturated monomers.

Stable dispersions of polymers in the polyepoxide are those dispersions which remain stable at a temperature above 60° C., preferably above about 90° C. For example, the polymer which forms the stable dispersed phase is one which is insoluble in the polyepoxide continuous phase at some temperature above 60° C., preferably at some temperature above about 90° C. Thus, for purposes of this invention the term "good stability" is referring to the dispersions of this invention can mean that (a) the particles do not coagulate or coalesce to an appreciable degree prior to use or during the curing process; (b) the particles have a controlled particle size; (c) the dispersions can be stored for reasonable periods without premature curing; and (d) the particles maintain a size and dispersion distribution which remains substantially unchanged during storing and processing.

Because this invention concerns stable dispersions of polymers in a polyepoxide continuous phase; it is understood that the stability of the dispersion depends upon the appropriate combination of polymerized vinyl monomers and epoxy resin. If the polymerization product of a particular monomer or monomers which form the desired dispersed phase in the polyepoxide forms an unstable dispersion, it is possible that the desired results can be obtained with the same monomer or monomers in a different polyepoxide. The stability can be improved in order to provide a dispersion which remains stable in the polyepoxide as per the definition of this invention by employing a particular polyepoxide, a particular dispersed phase polymer, a combination of a particular polyepoxide and a particular dispersed phase polymer, a dispersion stabilizer, or a change in the polymerization process.

Numerous factors affect the stability or insolubility of the dispersed polymer in the polyepoxide continuous phase. For example, polyepoxides having greater viscosities provide greater stability to the polymers of the dispersed phase. Dispersed polymer particles of smaller particle size generally have greater stability than larger size particles. A small difference in density between the dispersed and continuous phases generally provides a composition having greater dispersion stability than a composition having a large difference in density between the components of the aforementioned phases. Particles having less tendency to agglomerate provide compositions which have greater stability than those compositions which contain components which have a greater tendency to agglomerate. Thus, by altering the types of components which are employed in preparing the composition of this invention, it is possible to control factors such as the coagulation or coalescence of the dispersed phase in the continuous phase. It is understood that the presence of a dispersion stabilizer or the absence of undesirable flocculants in the composition can also control the amount of undesirable coagulation or coalescence of the dispersed phase in the continuous phase which occurs.

The dispersed phase can be in an amount of from about 5 to about 70 volume percent, preferably about 5 to about 50 percent of the total dispersion. The optimum concentration of polymeric dispersed phase can and will be varied depending upon the materials employed and the end use that is envisaged. The dispersions are usually made at a solids level at which the dispersions are to be used. However, it is possible to prepare higher solids dispersions and dilute to the final solids level.

The properties of the dispersion are influenced by a variety of factors including the identity of the components, the particle size and concentration of the disperse phase, the hardness or softness of the particles of the disperse phase, the concentration of the dispersion stabilizer and many other factors. For many applications it is most desirable to employ a dispersed phase polymer having a solution temperature above the polymerization temperature of said polymer and above the curing temperature of the polyepoxide.

For most practical applications, the stability of the dispersion and the property enhancement due to the dispersed phase will be optimized with particles that are less than some critical particle size which is about 20 microns.

The dispersiohs are solidified by curing the polyepoxide. In the curing of polyepoxides that the choice of curing agent can influence the cure rate, the exotherm and resultant properties of the finished product. Curing agents and their influence are known in the literature as, for example, in the book, *Handbook of Epoxy Resins,* (supra) and in *Chemical Reactions of Polymers,* Interscience Publishers, New York, pages 912–926, (1967) and in other reference works. Some of these influences are illustrated in *Modern Plastics Encyclopedia,* pages 33–34, (1982–1983).

The cured products have improved toughness over those without the dispersed phase. Also, the heat distortion temperatures are improved over those exhibited by the products obtained by curing a polyepoxide containing dissolved carboxylated rubbers as, for example, carboxy-terminated diene elastomers.

The properties of the cured products are also influenced by the hardness of the dispersed polymer. As a general rule, the best performance is obtained with polymer particles having glass transition temperatures below room temperature. Examples of such polymers are those homo- and copolymers of butyl acrylate, 2-ethylhexyl acrylate, butadiene, isoprene and vinylized polyalkylene oxide polymers.

The compositions of this invention are useful in all applications in which epoxy resins are useful. The compositions are especially well adapted for a variety of high performance, engineering plastic applications in which one or more of the physical properties of polyepoxides has been a limiting factor. An additional application is encapsulation of electrical components which are exposed to wide temperature fluctuations. For example, the compositions of this invention can exhibit improves toughness and can maintain hardness at high application temperatures. Another application is coating resins.

The concept of the invention is illustrated in the following examples. In the examples, all parts and percentages are by weight unless otherwise specified.

EXAMPLE 1

A stable dispersion of polyacrylonitrile in an epoxy resin is prepared as follows. Into a 2-liter, 3-necked, round-bottom flask which is equipped with an addition funnel, stirrer, condenser, thermocouple, and nitrogen sparge is charged 1,000 g of a diglycidyl ether of bisphenol A having an epoxide equivalent weight of from 178 to 186 and a viscosity at 25° C. of between 9,000 and 11,500 centipoise and sold commercially as D.E.R. ® 383 epoxy resin by The Dow Chemical Company. The epoxy resin is heated to 120° C. with stirring, and a solution of 3 g azobisisobutyronitrile, 150 g acrylonitrile and 350 g of the aforementioned epoxy resin is added to the flask over a 1-hour period. After heating the mixture at 120° C. for an additional 100 minutes, the remaining volatiles are removed from the mixture by vacuum distillation. The product is a viscous, stable yellow dispersion of hard polyacrylonitrile particles in an uncured epoxy resin.

In a substantially similar manner, but for comparison purposes, is prepared a product employing 6 g of the aforementioned catalyst, 200 g n-butyl acrylate and 200 g of the aforementioned epoxy resin. The product at 120° C. is clear in nature (indicating that it is not a dispersion) and upon cooling to room temperature is a 14 percent dispersion of poly(n-butyl acrylate) in the epoxy resin. After several days of storage the poly(n-butyl acrylate) particles in the epoxy resin coagulate, coalesce and cream to the surface of the epoxy resin which indicates a product having poor dispersion stability.

EXAMPLE 2

An insoluble dispersion of poly-2-ethylhexyl acrylate in an epoxy resin is prepared as follows. Into a reactor system as described in Example 1 is charged 1,000 g of a diglycidyl ether of bisphenol A having an epoxide equivalent weight of from 182 to 190 and a viscosity at 25° C. of between 11,000 and 14,000 centipoise and sold commercially as D.E.R. ® 331 epoxy resin by The Dow Chemical Company. The epoxy resin is heated to 100° C. with stirring under an air blanket, and 0.5 g ethyl triphenyl phosphonium acetate acetic acid complex, and 1 g acrylic acid is added thereto. The mixture is heated to 120° C. for hour. Under nitrogen blanket, a solution of 6 g azobisisobutyronitrile, 300 g 2-ethylhexyl acrylate and 200 g of the aforementioned epoxy resin is added to the reactor over a 75 minute period. After heating for an additional hour at 120° C., the dispersion product is isolated as described in Example 1. The dispersed particles are insoluble at 120° C. and do not dissolve upon heating to 260° C.

In a similar manner, stable dispersions are prepared using 5 g, 10 g, 15 g and 20 g of acrylic acid, respectively, rather than 1 g acrylic. The stability of the dispersion products so prepared increases with increasing acrylic acid content.

In a substantially similar manner, but for comparison purposes, is prepared a product employing 6 g of the aforementioned catalyst, 300 g 2-ethylhexyl acrylate, and 200 g of the aforementioned epoxy resin. The product which is poly(ethylhexyl acrylate) particles ih the epoxy resin is not a stable dispersion.

EXAMPLE 3

In a manner similar to that described in Example 1, is prepared numerous samples using the epoxy resin described in Example 1 and various ethylenically unsaturated monomers. The resin is heated to 100° C. under an air blanket; and 0.5 g ethyl triphenyl phosphonium acetate acetic acid complex and 10 g methacrylic acid are added thereto. The temperature of the mixture is raised to 120° C. over the next 30 minutes. Under nitrogen blanket, a solution of 3 g azobisisobutyronitrile, 300 g vinyl monomer, 10 g glycidyl methacrylate and 200 g of the epoxy resin is added over a 60 minute period. After heating for an additional hour at 102° C., the volatiles are removed under vacuum. The temperatures at which each of the samples becomes a solution upon heating are presented in Table I.

TABLE I

| Sample | Vinyl Monomer | Solution Temperature (°C.) |
| --- | --- | --- |
| 1 | n-pentyl acrylate | 98 |
| 2 | n-hexyl acrylate | 175 |
| 3 | 2-ethylhexyl acrylate | >260 |
| 4 | n-octyl methacrylate | 238 |
| 5 | isodecyl acrylate | >260 |
| 6 | isodecyl methacrylate | >260 |
| 7 | lauryl methacrylate | >260 |
| 8 | styrene | 62 |
| 9 | vinyltoluene | 184 |
| 10 | t-butylstyrene | >260 |
| C-1* | ethyl acrylate | <25 |
| C-2* | n-propyl acrylate | <25 |
| C-3* | n-butyl acrylate | 42 |

*Not an example of the invention.

The data in Table I illustrate that sample of the present invention are dispersions of an organic polymer in a polyepoxide and are further characterized in that the dispersion remains insoluble in the polyepoxide at a temperature of at least 60° C., and preferably of at least 90° C.

EXAMPLE 4

A stable dispersion of poly-2-ethylhexyl acrylate in an epoxy resin is prepared as follows. Into a reactor system as described in Example 1 is charged 1,000 g of the epoxy resin of Example 2. The epoxy resin is treated with 10 g acrylic acid in a manner as described in Example 2 (i.e., the mixture is heated to 100° C. while the acrylic acid and catalyst is added thereto). This mixture is heated to 120° C. for 1 hour. Under nitrogen blanket, a solution of 6 g azobisisobutyronitrile, 300 g 2-ethylhexyl acrylate, 1 g glycidyl methacrylate and 200 g of the aforementioned epoxy resin is added to the mixture over a 90 minute period. After heating for an additional hour at 120° C., the stable dispersion product is isolated as described in Example 1.

EXAMPLE 5

A stable dispersion of poly-2-ethylhexyl acrylate in an epoxy resin is prepared as follows. Into a reactor system as described in Example 1 is charged 1,000 g of a polyglycidyl ether of a novolac of phenol and formaldehyde having an average number of phenols and an oxirane functionality of 2.2, an epoxide equivalent weight of from 172 to 179, a viscosity at 25° C. of between 1,400 and 2,000 centipoise and sold commercially as D.E.N. ® 431 epoxy novolac by The Dow Chemical Company. The epoxy resin is heated to 100° C. with stirring under an air blanket, and 0.5 g ethyl triphenyl phosphonium acetate acetic acid complex and 5 g methacrylic acid is added thereto. The temperature of the mixture is further raised to 120° C. over a 30 minute period. Under nitrogen blanket, solution of 6 g azobisisobutyronitrile, 300 g 2-ethylhexyl acrylate, 10 g glycidyl methyacrylate and 200 g of the aforementioned epoxy resin is added to the reactor over a 60-minute period. After heating for an additional hour at 120° C., the stable dispersion product is isolated as described in Example 1. The dispersed particles are small in size and exhibit high stability.

In a similar manner, stable dispersion products are prepared using 10 g and 15 g of methacrylic acid, respectively, rather than 5 g of methacrylic acid.

EXAMPLE 6

A stable dispersion of poly-2-ethylhexyl acrylate copolymerized with divinyl benzene for an increased molecular weight in an epoxy resin is prepared as follows. Into a reactor system as described in Example 1 is charged 1,000 g of the epoxy resin which is described in Example 1. The resin is esterified by reaction with 5 g of methacrylic acid under conditions as described in Example 5. The mixture is heated to 120° C for 1 hour. Under nitrogen blanket, a solution of 3 g azobisisobutyronitrile, 300 g 2-ethylhexyl acrylate, 10 g glycidyl methacrylate, 0.5 g divinylbenzene and 200 g of the aforementioned resin is added to the reactor system over a 1-hour period. After heating for an additional hour at 120° C., the stable dispersion product is isolated as described in Example 1. The product exhibits a Brookfield viscosity of 23,600 cps at 25° C.

EXAMPLE 7

A stable dispersion of poly-2-ethylhexyl acrylate in an epoxy resin and employing an isopropenyl phenol reactive monomer in preparing a dispersion stabilizer is prepared as follows. Into a reactor system as described in Example 1 is charged 1,000 g of the epoxy resin which is described in Example 2. The resin is heated to 100° C. under an air blanket and 1 g 2,6-di-tertiary-butyl-4-methylphenol antioxidant, 5 g isopropenyl phenol, and 0.5 g of a 70 percent solution of ethyltriphenyl phosphonium acetate acetic acid complex in methanol are added with stirring. The temperature of the mixture is raised to 120° C. over 35 minutes. Under nitrogen blanket a solution of 6 g azobisisobutyronitrile, 300 g 2-ethylhexyl acrylate and 200 g of the aforementioned resin is added to the mixture over a 75 minute period. After heating is continued for an additional hour at 120° C., the stable dispersion product is isolated as described in Example 1.

EXAMPLE 8

A stable dispersion of poly-2-ethylhexyl acrylate in any epoxy resin and employing an isocyanatoethyl methacrylate reactive monomer in preparing a dispersion stabilizer is prepared as follows. Into a reactor system as described in Example 1 is charged 1,000 g of the epoxy resin described in Example 2. The resin is heated to 110° C., under an air blanket, and 0.1 g dibutyltin dilaurate catalyst and 10 g isocyanatoethyl methacrylate are added with stirring. The temperature is raised to 110° C. and held at that temperature for 1 hour. Under nitrogen atmosphere is added to the reaction mixture a solution of 3 g azobisisobutyronitrile, 300 g 2-ethylhexyl acrylate, 10 g glycidyl methacrylate, 10 g methacrylic acid, and 200 g of the aforementioned epoxy resin over a 1 hour period. After heating the mixture for an additional 30 minutes, the product is subjected to vacuum distillation. The product is a stable dispersion.

The dispersion is further treated by adding thereto 0.5 g of ethyl triphenyl phosphonium acetate acetic acid complex while the dispersion is held at 110° C. The temperature of the mixture is held at 110° C. for an additional 75 minutes. The product remains a stable dispersion.

EXAMPLE 9

A stable dispersion of poly-2-ethylhexyl acrylate in an epoxy resin is prepared by providing a vinylized epoxy resin adduct and providing a dispersion by reacting the vinylized epoxy resin adduct, 2-ethylhexyl acrylate and epoxy resin as follows. Into a reactor system as described in Example 1 is charged 924 g of the epoxy resin which is described in Example 1. The resin is heated to 100° C., and 43.04 g methacrylic acid and 0.25 g ethyl triphenyl phosphonium acetate acetic acid complex are added thereto. The temperature is maintained at 100° C. and the reaction rate is followed by titrating excess acid for 3 hours, at which time the reaction is 99 percent complete. The vinylized adduct product is a clear, viscous, partial ester of the epoxy resin. Into a reactor system as described in Example 1 is charged 115 g of the aforementioned vinylized adduct and 885 g of the aforementioned epoxy resin. The contents of the reactor are heated to 120° C. under nitrogen atmosphere and a solution of 3 g azobisisobutyronitrile, 300 g 2-ethylhexyl acrylate, 10 g glycidyl methacrylate and 200 g of the aforementioned epoxy resin is added thereto over a 45 minute period. The mixture is heated at 120° C. for an additional 30 minutes and the product is treated as in Example 1. The product is a stable dispersion.

EXAMPLE 10

A stable dispersion of 2-ethylhexyl acrylate in an epoxy resin is prepared by providing a vinylized epoxy resin adduct; providing a grafted polymeric dispersion and epoxy resin; and providing a dispersion by reacting 2-ethyl hexyl acrylate in the presence of the grafted polymeric dispersant as follows. Into a reactor system as described in Example 1 is charged 1439 g of the epoxy resin described in Example 1 and heated to 90° C. under air blanket with stirring. To the reactor system is added 60 g methacrylic acid and 1.2 g of the catalyst of Example 9. The temperature of the reaction mixture is held at 90° C. for 140 minutes at which time greater than 99 percent of the methacrylic acid has reacted. To themmixture is then added 0.2 g 2,6-di-tertiary-butyl-4-methylphenol antioxidant, and the vinylized adduct product is cooled.

Into a reactor system as described in Example 1 is charged 199.3 g of the aforementioned epoxy resin and heated to 110° C. under nitrogen blanket. To this is added 5 g azobisisobutyronitrile, 199.3 g 2-ethylhexyl acrylate and 996.4 g vinylized adduct over a 95 minute period with mixing. After heating the mixture for an additional 30 minute period, the product is stripped under vacuum. The product is a clear, viscous liquid polymeric dispersant.

Into a reactor system as described in Example 1 is charged 276.3 g of the polymeric dispersant and 718.4 g of the aforementioned epoxy resin. The contents are heated to 110° C. under nitrogen atmosphere, and a solution of 1.97 g azobisisobutyronitrile and 197.4 g 2-ethylhexyl acrylate over a 1 hour period. The mixture is heated at 110° C. for an additional 30 minutes and the rroduct is stripped under vacuum. The product is a stable dispersion.

The dispersion is heated to 60° C. and is mixed with a stoichiometric amount of triethylene tetramine. This warm mixture is degassed by evacuating the mixture for about 2 minutes until rapid evaluation of gas ceases. The mixture is poured into a mold and cured under ambient conditions for 16 to 20 hours. The mixture is post cured at 150° C. for 1 hour. The samples are machined in sizes and shapes for testing. The fracture energy ($G_1C$) of the sample is measured using a double edge notch technique as defined in *Plane Strain Crack Toughness Testing of High Strength Metallic , Materials* by W. E. Brown, Jr. and J. E. Srawley in "ASTM Special Technical Bulletin #410", ASTM Philadelphia, Pa. (1969) and is 0.61 $KJ/m^2$. The glass transition temperature ($T_g$) of the sample is measured using a dynamic modulus at 0.1 Hz, performed on Rheometrics Mechanical Spectrometer Model RMS605 and is 118° C. These values compare with a sample of untreated epoxy resin which exhibits a $T_g$ of 118° C. and a $G_{1C}$ of 0.35 $KJ/m^2$.

EXAMPLE 11

A stable dispersion of poly-2-ethylhexyl acrylate in an epoxy resin is prepared as follows. Into a reactor system as.described in Example 1 is charged 600 g of tris(4-glycidylphenyl)methane which is sold as XD-7342.00 by The Dow Chemical Company. The resin is heated to 100° C. under an air blanket, and 0.5 g ethyl triphenyl phosphonium acetate acetic acid complex and 5 g methacrylic acid are added thereto with stirring. The temperature of the mixture is raised to 120° C. over the next 30 minutes. Under a nitrogen blanket is added over a 45 minute period 2 g of a solution of azobisisobutyronitrile., 200 g 2-ethylhexyl acrylate, 10 g glycidyl methacrylate and 200 g of the epoxy resin described in Example 1. After heating the mixture for an additional 30 minutes at 120° C., the volatiles are removed under vacuum. The product is a semi-solid, amber, stable dispersion.

In the same manner as previously described are prepared stable dispersions where the amount of methacrylic acid is varied at 0 g, 5 g and 15 g, respectively. The particle sizes of the dispersed phase particles decrease as the amount of methacrylate acid increases.

EXAMPLE 12

A stable dispersion of poly-2-ethylhexyl acrylate in an epoxy resin is prepred as follows. Into a reactor system as described in Example 1 is charged 1200 g of a polyglycidyl ether of a novolac of phenol and formaldehyde having an average number of phenols and thus an oxirane functionality of 3.6; an epoxide equivalent weight of from 175 to 182 and a viscosity at 25° C. of between 30,000 and 90,000 Centipoises, and sold commercially as D.E.N. ® 438 epoxy novolac by The Dow Chemical Company. The resin is heated to 100° C. under an air blanket, and 0.5 g of the catalyst complex of Example 11 and 2.5 g methacrylic acid are added with stirring. The temperature is raised to 120° C. over the next 30 minutes and held for a total time of 1 hour. Under a nitrogen blanket, 0.3 g of a solution of azobisisobutyronitrile, 300 g 2-ethylhexyl acrylate and 10 g glycidyl methacrylate is added over a 60 minute period. After heating for an additional 30 minutes at 120° C., the volatiles are removed under vacuum. The final product is a semi-solid stable dispersion.

In a similar manner as previously described are prepared stable dispersions where the amount of methacrylic acid is varied at 0 g, 10 g, 15 g and 20 g. The particle sizes of the dispersed phase particles decrease as the amoun of methacrylic acid increases.

EXAMPLE 13

A stable dispersion of poly-2-ethylhexyl acrylate in an epoxy resin is prepared as follows. In a reactor system as described in Example 1 is charged 1200 g of a solid diglycidyl ether of bisphenol-A having a molecular weight enhancement with bisphenol-A to an epoxide equivalent weight of from 730 to 840, a softening range of between 88° C. and 98° C. and sold commercially as D.E.R. ® 663u epoxy resin by The Dow Chemical Company. The resin is heated to 150° C. under an air blanket, and 0.5 g of the catalyst complex of Example 11 and 2.5 g methacrylic acid are added with stirring. The temperature is held at 150° C. for an additional 60 minutes. Under a nitrogen blanket 3 g of a solution of 2-t-butylazo-2-cyanobutane (sold commercially as Luazo ® 82 catalyst by Lucidol Division of Pennwalt Corporation), 300 g 2-ethylhexyl acrylate and 10 g glycidyl methacrylate are added to the mixture over a 60 minute period. After heating for an additional hour at 120° C., the volatiles are removed under vacuum. The final product is a stable dispersion in a solid resin.

EXAMPLE 14

In a manner similar to that described in Example 13 is prepared a dispersion by replacing the epoxy resin of Example 13 with a brominated resin. The brominated resi is a solid diglycidyl ether of bisphenol-A having a bromine content of 18 to 20 percent and an epoxide equivalent weight of from 445 to 520, a softening range of between 68° C. and 80° C. and sold commercially as D.E.R. ® 511 epoxy resin by The Dow Chemical Company.

EXAMPLE 15

Into a reactor system as described in Example 1 is charged 1050 g of a solid diglycidyl ether of bisphenol-A having a moleuclar weight enhancement with bisphenol A to an epoxide equivalent weight of from 475 to 575, a softening range of between 70° C. and 80° C. and sold commercially as D.E.R. ® 661 epoxy resin by The Dow Chemical Company. The epoxy resin is heated to 120° C., and 15 g acrylic acid, 1 antioxidant and 0.5 g of the catalyst complex of Example 11 are added thereto. The temperature is maintained at 120° C. for an additional 30 minutes after which time the product is poured into metal trays and allowed to cool. The final product is a solid, clear, partial ester resin that is an example of vinylized adduct.

To a reactor system as described in Example 1 are added 300 g of vinylized adduct and 700 g of the epoxy resin described as in Example 2. The mixture is heated to 120° C. under nitrogen atomosphere, and a solution of 6 g azobisisobutyronitrile, 300 g 2-ethylhexyl acrylate, 10 g glycidyl methacrylate and 200 g of the epoxy resin of Example 1 are added thereto over a 45 minute period with mixing. After heating for an additional hour at 120° C., the product is stripped under vacuum. The product is a dispersion wherein the dispersed phase particles have a small size.

EXAMPLE 16

In a manner similar to Example 15 is prepared a dispersion by employing 800 g of the epoxy resin of Example 2 and 200 g of the vinylized adduct. The particle size of the dispersed phase particles have a larger size than those particles of the dispersion of Example 15.

EXAMPLE 17

In a manner similar to Example 15 is prepared a dispersion by employing 900 g of the epoxy resin of Example 2 and 100 g of the vinylized adduct. The particle size of the dispersed phase particles have a larger size than those particles of the dispersions of Examples 15 and 16.

EXAMPLE 18

In a reactor as described in Example 1 are charged 1848 g of the epoxy resin described in Example 1 and 0.2 g antioxidant. The epoxy resin is esterified to provide a vinylized adduct by employing 86 g methacrylic acid using a method as described in Example 15.

Into a reactor as described in Example 1 is charged 200 g of the epoxy resin described in Example 1. The resin is heated to 110° C. under nitrogen blanket, and a 1.25 g solution of azobisisobutyronitrile, 250 g 2-ethylhexyl acrylate and 800 g of the vinylized adduct is added over a 1 hour period while mixing. After heating the mixture for an additional 5.25 hours, the product is stripped under vacuum. The product is a cloudy, viscous, liquid polymeric dispersion and is called a polymeric dispersant.

Into a reactor system as described in Example 1 are charged 300 g of the polymeric dispersant and 760 g of the epoxy resin of Example 2. The contents are heated to 105° C. under a nitrogen atmosphere, and a solution of 1.25 g azobisisobutyronitrile, 240 g 2-ethylhexyl acrylate, 10 g glycidyl methacrylate and 200 g of the epoxy resin of Example 1 are added over a 1 hour period. After heating for an additional 30 minutes at 105° C., the product is stripped under vacuum. The final product is a stable dispersion.

EXAMPLE 19

A dispersion of poly-2-ethylhexyl acrylate in the epoxy resin of Example 1 is prepared using techniques similar to those described in Example 2 except that t-butylperbenzoate is employed as a vinyl initiator, a trifunctional acrylate is employed in order to build molecular weight of the vinyl polymer, and higher levels of glycidyl methacrylate are employed. The dispersion is cured by mixing the product with a stoichiometric quanttty of p,p'-methylenediphenyl aniline; heating the mixture to 60° C.; and degassing the mixture. The degassed mixture is poured into a mold and allowed to cure for 2 hours at 100° C. Post curing is performed at 180° C. for 2 hours. The cured castings are machined to sizes and shapes for further testing. The sample is designated as Sample No. 1.

For comparison purposes the previously described epoxy resin is cured and tested. The sample is designated as Sample No. C-1.

For comparison purposes an unmodified and carboxy-terminated butadiene-acrylonitrile (CTBN) modified epoxy resin is prepared and cured. The sample is designated as Sample No. C-2.

Data concerning the samples are presented in Table II.

TABLE II

| Sample[1] | Particle Size (μm) | Tensile Strength (psi) | Tensile Elongation (%) | Tensile Modulus (psi) | $G_{1C}$ KJ/m$^2$ | Notched Impact (ft.lb/in) | DTUL 0° C. | Viscosity (cps at 25° C.) |
|---|---|---|---|---|---|---|---|---|
| 1 | 0.2 | 9,200 | 8.9 | 2.5 × 10$^5$ | 0.63 | 0.5 | 165 | 34,000 |
| C-1* | — | 12,000 | 5.5 | 4.0 × 10$^5$ | 0.16 | 0.27 | 165 | 10,000 |
| C-2* | 0.38 | 10,000 | 7.7 | 3.33 × 10$^5$ | 0.48 | 0.5 | 144 | 50,000 |

*Not an example of the invention.

[1]Sample 1 contains 10 percent poly-2-ethylhexyl acrylate as a dispersed phase Sample C-2 contains 10 percent CTBN as a dispersed phase. The CTBN is Hycar ® 1300 × 13 which is sold by the B. F. Goodrich Company.

The $T_g$ of all the samples in Table II are substantially similar. The data in Table II show that the stable dispersion of the invention has improved toughness (i.e., as higher $G_{1C}$) than the comparative sample while exhibiting a comparable $T_g$. The example of the invention exhibits a significant improvement in toughness while reductions in $T_g$ and DTUL are minimized.

What is claimed is:

1. A process for preparing a stable polymer-in-polyepoxide dispersion wherein a small amount of an unsaturated compound having an oxirane-reactive functionality is reacted with an excess of a polyepoxide at a temperature above the softening point of the polyepoxide to form a blend of polyepoxide and a dispersion stabilizer-precursor having free oxirane groups, adding ethylenically unsaturated monomer thereto which is then polymerized at a temperature above the softening point of the polyepoxide without curing said oxirane groups to form a stable polymer-in-polyepoxide dispersion.

2. The method of claim 1 wherein said polyepoxide is a liquid polyepoxide.

3. The method of claim 1 wherein said ethylenically unsaturated monomer is an alkyl acrylate.

4. The method of claim 3 wherein said alkyl acrylate is 2-ethylically acrylate.

5. The method of claim 1 wherein the dispersion stabilizer-precursor is the reaction product of an unsaturated carboxylic acid and a polyepoxide.

6. The method of claim 1 wherein the dispersion stabilizer-precursor is the reaction product of an unsaturated isocyanate and a polyepoxide.

7. The method of claim 1 wherein the dipersion stabilizer-precursor is the reaction product of an alkenyl substituted phenol and a polyepoxide.

8. The method of claim 1 wherein additional polyepoxide is added with the ethylenically unsautrated monomer.

* * * * *